(12) United States Patent
Van Dyk

(10) Patent No.: US 6,631,610 B1
(45) Date of Patent: Oct. 14, 2003

(54) CONSUMABLE PORT COVER FOR DUCTED INTEGRAL ROCKET-RAMJET ENGINE

(75) Inventor: Richard A. Van Dyk, Union, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 06/511,075

(22) Filed: Jul. 5, 1983

(51) Int. Cl.[7] ................................ F02K 7/18
(52) U.S. Cl. ..................... 60/245; 60/250; 60/767
(58) Field of Search ................ 60/245, 270.1, 60/250, 251, 225, 254, 767; 102/336, 202.14, 275.1, 530

(56) References Cited

U.S. PATENT DOCUMENTS

| | | | |
|---|---|---|---|
| 2,912,820 A | 11/1959 | Whitmore | 60/35.6 |
| 2,987,875 A * | 6/1961 | Fox | 60/270.1 X |
| 3,040,517 A | 6/1962 | Ryden et al. | 60/35.6 |
| 3,357,187 A * | 12/1967 | Whitlock, Jr. | 60/270.1 X |
| 3,855,789 A | 12/1974 | Platzek | 60/225 |
| 3,901,028 A | 8/1975 | Leingang | 60/225 |
| 3,972,287 A * | 8/1976 | Travor et al. | 102/530 |
| 4,202,172 A * | 5/1980 | Brunner | 60/270.1 X |
| 4,299,166 A * | 11/1981 | Carignan et al. | 102/336 |

* cited by examiner

Primary Examiner—Carlton R. Croyle
Assistant Examiner—Jeffrey A Simenauer
(74) Attorney, Agent, or Firm—Charles E. Bricker; Thomas L. Kundert

(57) ABSTRACT

In an integral rocket-ramjet engine the air intake ports are covered with a port cover made of a laminate of Pd and Al. This port cover is rapidly consumed in the brief period between the end of the rocket mode and commencement of the ramjet mode to allow ingress of ram air for the ramjet engine.

5 Claims, 2 Drawing Sheets

CONSUMABLE PORT COVER FOR DUCTED INTEGRAL ROCKET-RAMJET ENGINE

RIGHTS OF THE GOVERNMENT

The invention described herein may be manufactured and used by or for the Government of the United States for all governmental purposes without the payment of any royalty.

BACKGROUND OF THE INVENTION

This invention relates to integral rocket-ramjet engines.

It is well known that a ramjet engine must attain a certain speed in the atmosphere before it will begin to operate. Because of this requirement a booster rocket motor is employed to bring the ramjet engine to the operable ramjet speed at which time the rocket motor ceases to operate and the ramjet engine commences to operate.

Various arrangements have been used in combination rocket ramjet engines. In the prior art, the boost propellant has been structurally and functionally integrated with the ramjet combustor is as in the patent to Whitmore, U.S. Pat. No. 2,912,820. Whitmore discloses a combined rocket-ramjet engine comprising an engine casing with an air inlet at one end and an exhaust outlet at the other end. A partition separates the casing into upstream and downstream chambers. The downstream chamber contains means for burning rocket fuel. In operation the burning rocket fuel heats, melts, burns, vaporizes or otherwise reduces the partition so that an air flow path is established between the air inlet and the exhaust outlet, thereby permitting operation of the ramjet. The partition is described as being made entirely of metal which is volatilized at or slightly below the temperature at which the rocket fuel burns, or it may be made partly of such material and partly of metal capable of withstanding greater heat.

For certain applications for combination rocket-ramjet engines, compact construction is desirable. One such compact construction uses an inlet diffuser duct which extends along the side of a missile to supply air to a sudden expansion or dump type combustor positioned aft of the missile. In these combustors, the rocket boost propellant is located in the combustor. After rocket motor burnout, the apparatus converts to ramjet operation. The air entrance port to the combustor must be covered until the rocket motor burn is substantially complete; otherwise the forward progress of the missile could be retarded by rocket exhaust gases backflowing through the air intake duct. At the same time transition from the rocket mode of propulsion to the ramjet mode must be relatively fast so that the drag of the missile body does not appreciably reduce the forward speed of the missile.

Mere volatilization of a metal port cover, as disclosed by Whitmore would be too slow. Such volatilization would have to commence prior to completion of the rocket burn, thereby allowing backflow of the rocket gases.

In the prior art the port covers have been ejected. This, however, can present a hazard to the launch and/or chase aircraft. What is desired is a port cover for an integral rocket-ramjet engine which eliminates particle ejecta of significant size.

It is therefore and object of the present invention to provide an improved integral rocket-ramjet engine.

Other objects, aspects and advantages of the present invention will become apparent in following the description of the illustrations.

SUMMARY OF THE INVENTION

In accordance with the present invention there is provided an integral rocket-ramjet engine which comprises a port cover for preventing backflow of booster gases into the air entrance during the period of rocket burn, wherein the port cover is made of a material which is rapidly consumed in the brief interim period between the end of rocket burn and the initiation of ramjet burn.

DETAILED DESCRIPTION OF THE DRAWINGS

Figure 1:
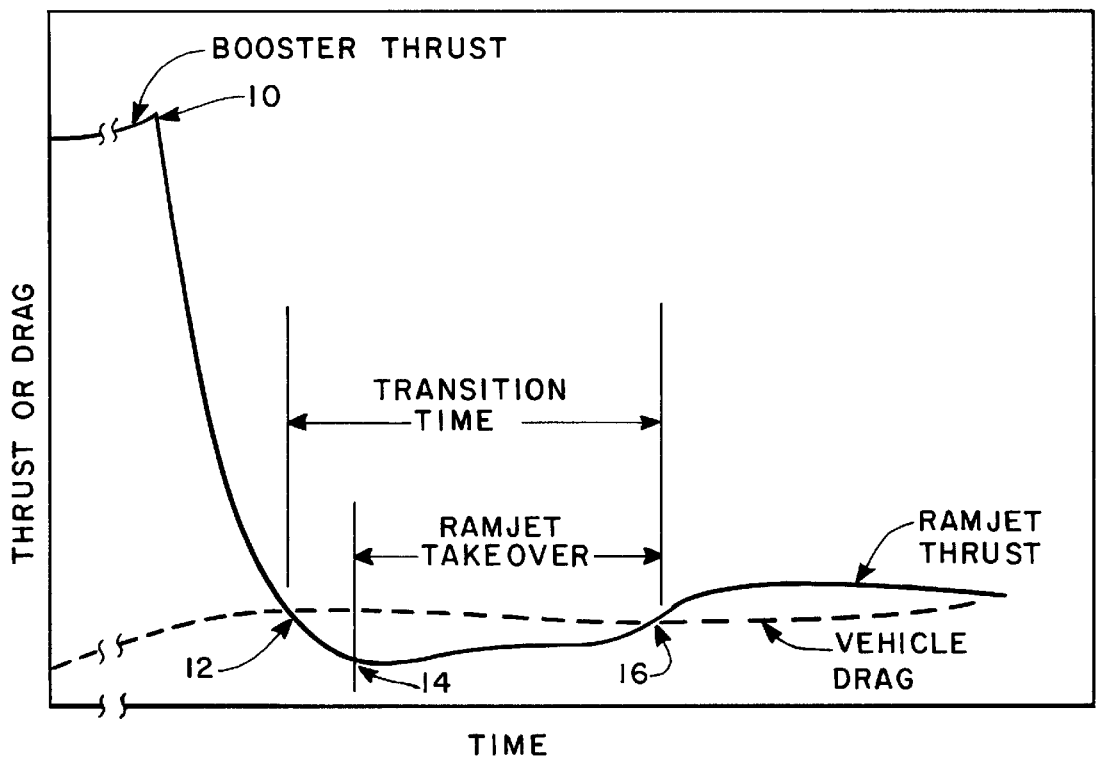
FIG. 1 is a graph illustrating thrust and drag versus time.

Referring first to FIG. 1, which is largely self-explanatory, it can be seen that during the time of the rocket burn, rocket thrust greatly exceeds the drag exerted by the missile body. At the end of the rocket burn, identified by the reference numeral 10, thrust falls off rapidly to the point 12 where thrust equals drag. The thrust continues to fall off, until, at point 14, the ramjet commences operation. The thrust provided by the ramjet thereafter increases until, at point 16, ramjet thrust is equal to the missile body drag. After point 16 ramjet thrust is greater than the missile body drag. During the interval between point 12 and point 16, hereinafter referred to as the actual transition time. i.e., the transition from the rocket mode to the ramjet mode, the vehicle drag exceeds thrust and the vehicle decelerates. The maximum allowable transition time is about 500 msec, preferably about 300 msec. The actual transition time is generally less than the maximum allowable transition time.

Figure 2:
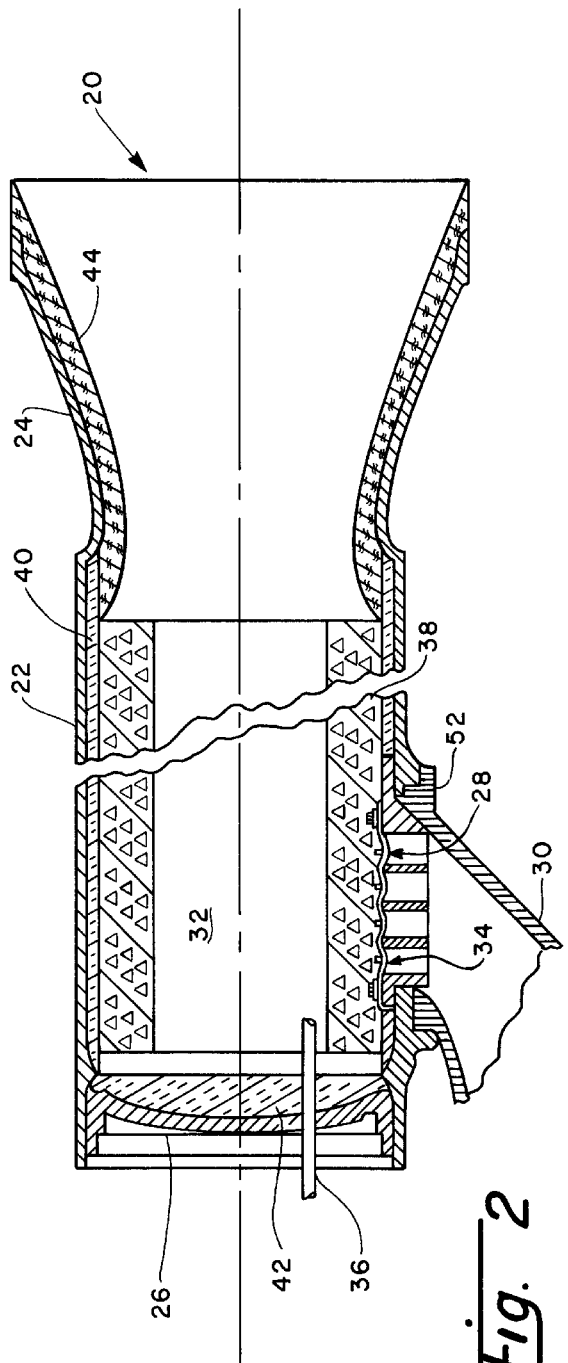
FIG. 2 is a partial longitudinal sectional view of an integral rocket-ramjet illustrating placement of a port cover.

An exemplary intergral rocket-ramjet engine is illustrated in FIG. 2. The engine, designated generally by the reference numeral 20, comprises a cylindrical metal casing 22 with a tandem discharge nozzle 24, a forward closure 26, at least one air intake port 28, at least one air intake duct 30 in operable communication with port 28 and extending forward of the combustion chamber 32 of engine 20, a port cover 34 positioned between the intake port 28 and the combustion chamber 32, fuel inlet means or nozzles 36, and a solid rocket motor 38. The casing 22 has a circumferential layer 40 of insulating material, the forward closure 26 has a layer 42 of insulating material and the discharge nozzle 24 has a layer 44 of insulating material.

Figure 3:
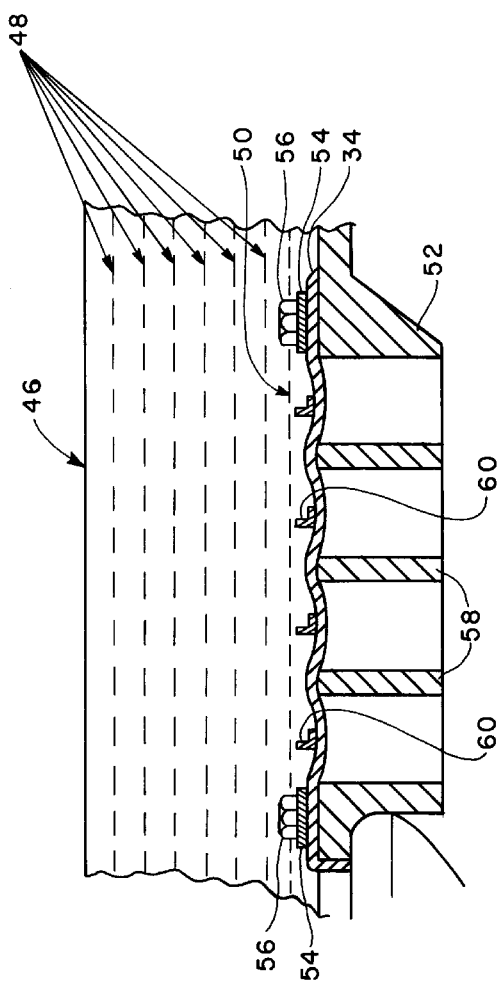
FIG. 3 is a partial longitudinal sectional view illustrating the rocket booster propellant burnback profiles.

The port cover 34 is a metallic sheet which is consumable within the allowable transition time. Referring to FIG. 3, burn-back of the rocket propellant material proceeds from the initial profile 46 through a plurality of interim profiles 48 to a final profile 50. The final profile 50 occurs at or near the point 10 in FIG. 1. In the interval from point 12 to point 16 of FIG. 1, it is necessary that the port cover 34 be consumed in order to admit ram air into the combustion chamber 32. The term "consume", including its adjective, as used herein, is intended to include combustion in air as well as reaction without requiring air. The term "air", as used herein, is intended to mean the ordinary mixture of oxygen, nitrogen and various other gases that surrounds the earth, i.e., the atmosphere. The term "air" is not intended to mean pure oxygen, oxygen-enriched air, or any other pure gas. In addition to being consumable within the allowable transition time, the port cover 34 should have a tensile strength of at least about 25 ksi in order to withstand booster pressure.

The port cover 34 is a laminate structure consisting of palladium and aluminum. The laminate is capable of reacting intermetallically to form palladium aluminide (PdAl) generating a considerable amount of energy and a fairly high reaction temperature. The resulting PdAl is a fine sand-like powder which is combustible in the combustion chamber. The activation temperature for the intermetallic reaction is about 1200 degrees-F., the adiabatic reaction temperature is 4316 degrees-F. and the heat of reaction is 589 Btu/lb. The thickness of the laminate should be at least about 0.020 inch, preferably about 0.025 to 0.050 inch, and up to a maximum of about 0.100 inch.

In a related application, Ser. No. 06/511,069, filed of even date herewith, E. O. Kalil and P. R. Scannell disclose a ducted integral rocket-ramjet engine comprising a consumable port cover made of a single laminate of palladium and aluminum having the configuration Pd—Al—Pd wherein each thickness of Pd is about ½ the thickness of the Al layer.

In contrast thereto the port cover of the present invention comprises a plurality of alternating plies of palladium and aluminum having at least six Pd—Al—Pd interfaces. This port cover, like the simple Pd—Al—Pd laminate disclosed in Ser. No. 06/511,069 contains approximately equal molar quantities of palladium and aluminum.

Figure 4:
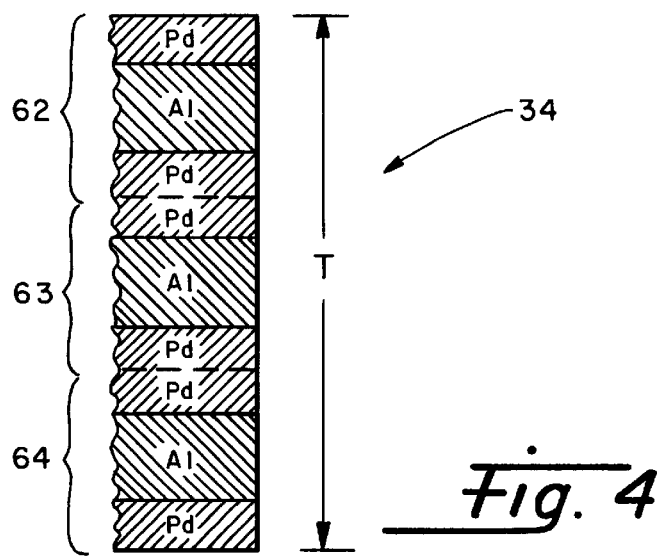
FIG. 4 is a cross-sectional view through one port cover material in accordance with the invention.

Referring to FIG. 4, the port cover of this invention, designated generally by the reference numeral 34 consists of alternating plies of Pd and Al and has at least 6 Pd—Al interfaces, with Pd on the outside faces. The port cover 34 may be defined by at least three sandwich structures 62, 63 and 64 bonded together. Each sandwich structure has the configuration Pd—Al—Pd and in each configuration the thickness of each Pd layer is approximately one-half that of the Al layer. The sandwich structures 62, 63 and 64 may have any thickness but generally will be of equal thickness and the total thickness T of port cover 34 is equal to the sum of the thicknesses of 62, 63 and 64.

The Pd—Al—Pd laminate is available commercially in a variety of thicknesses from about 0.001 inch to about 0.500 inch, under the tradename, "Pyrofuze" from Sigmund Cohn, Mt. Vernon, N.Y. It is also available under the tradename "EXO-Sheet" from American Fine Wire Corp., Selma, Ala.

The multiple laminate port cover 34 may be produced by bonding together a plurality of the single Pd—Al—Pd sandwiches, either adhesively or intermetallically, as by soldering or diffusion bonding. Alternatively, port cover 34 may be produced by diffusion bonding a laminate construction consisting of alternating layers of Pd and Al of appropriate thickness.

Referring again to FIGS. 2 and 3, the consumable port cover 34 is shown mounted upon a support structure 52 which may be integral with the casing 22 or a separate structure, as shown. The port cover 34 is mounted upon support structure 52. As a separate structure, 52 may be bonded or press fit into the casing 22. The port cover 34 is retained mechanically on the support structure 52 by a circumferential metal gasket 54 and a plurality of bolts 56. It may also be retained by bonding or other mechanical means. The support structure 52 has a plurality of support vanes 58, including one or more longitudinal vanes, not shown.

In order for the Pd—Al—Pd laminate to react to form PdAl, a high concentration of energy must be applied to the laminate to attain an initiation temperature of about 1200 degrees-F. To remain within the desired time frame for consumption of the port cover, the reaction has to be initiated by the burning booster propellant. In many cases, however, the burning booster propellant, which has relatively high burn rate, does not have sufficient contact time with the port cover to initiate the reaction. The alloying reaction of the Pd—Al—Pd laminate can also be quenched when the port cover is in contact with a sufficiently large heat sink. It will be appreciated that the support structure 52 can act as a large heat sink.

It was found that the problem of quenching is minimized by employing the port cover 34 of this invention. The problem of contact time can be overcome by attaching ignition tabs 60, made of the same material, to the port cover 34, by soldering or other means. The ignition tabs 60 extend inwardly from the port cover 34 a distance of about 0.10 inch to about 0.25 inch as determined by the propellant burn rate. It can be seen in FIG. 3 that the tabs 60 are initiated during the final stage 50 of burning of the cast propellant 38.

The integral rocket-ramjet engine 20 is prepared for use by applying or otherwise installing the layers 40, 42 and 44 of insulation against the casing 22, the forward closure 26 and the discharge nozzle 24, respectively. One or more areas of insulation 40 are cut away to allow for installation of the port cover 34. Following installation of the port cover 34, the rocket motor 38 is cast in place and cured.

In operation, the rocket motor 38 is ignited by an ignitor, not shown. At or near the end of the rocket burn, the port cover 34 is heated to its ignition or activation temperature. The intermetallic reaction is swift, resulting in fine sand-like particles of PdAl which are consumed in the combustion chamber 32.

Various modifications of the present invention are possible in light of the above teachings.

I claim:

1. In an integral rocket-ramjet engine comprising an engine casing provided with at least one air inlet at one end thereof and an exhaust outlet at the other end, at least one intake duct operably connected to said air inlet and extending forward of the combustion chamber defined by said casing for supplying ram air to said combustion chamber, means for supplying ramjet fuel to said combustion chamber, a rocket motor positioned within said combustion chamber, a removable port cover for covering each of said air inlets for preventing backflow of booster gases prior to substantial completion of rocket motor burn and allowing ingress of ram air at the substantial completion of said rocket motor burn, the improvement wherein said port cover is a laminate material consisting of alternating plies of Pd and Al in approximately equimolar quantities, having at least 6 Pd—Al interfaces, with Pd on the outside faces, wherein said port cover has a thickness in the approximate range of 0.020 inch to 0.100 inch, and wherein said port cover has a plurality of ignition tabs attached thereto, said ignition tabs extending into said rocket motor.

2. The engine of claim 1 wherein said port cover is defined by at least 3 sandwich constructions, each construction having the configuration Pd—Al—Pd.

3. The engine of claim 2 wherein said port cover has a thickness of about 0.025 to 0.050 inch.

4. The engine of claim 1 wherein said ignition tabs have a height of about 0.10 inch to about 0.25 inch.

5. The engine of claim 1 wherein said ignition tabs are soldered to said port cover.

* * * * *